Nov. 23, 1965    A. L. HUBBARD ETAL    3,219,145
COTTON HARVESTER
Filed July 16, 1962                                    2 Sheets-Sheet 1
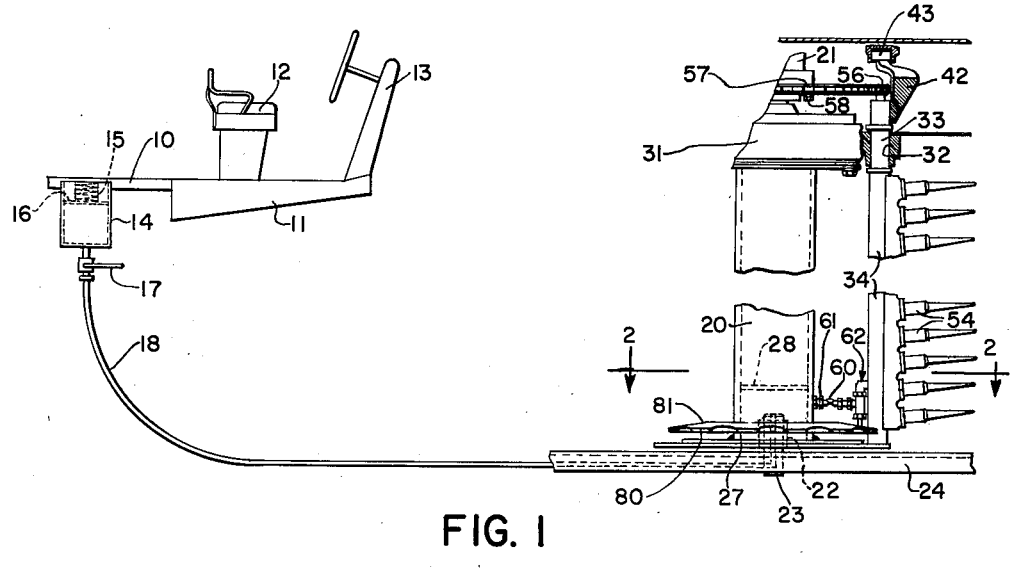
FIG. 1
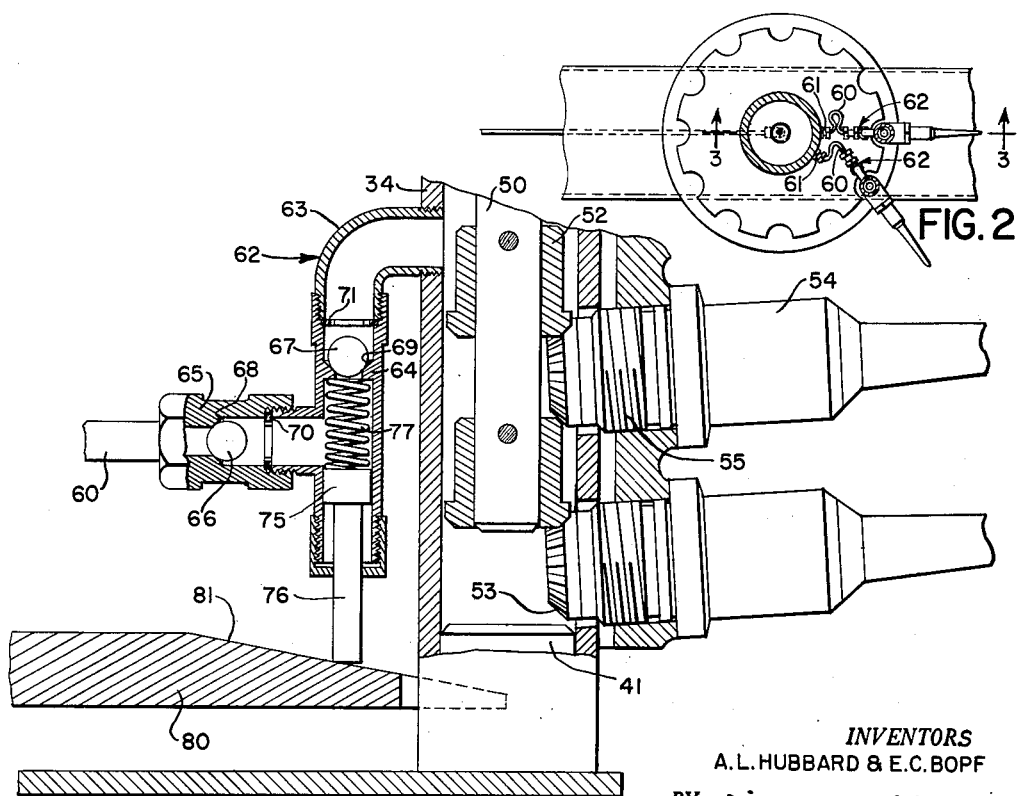
FIG. 2
FIG. 3
INVENTORS
A.L. HUBBARD & E.C. BOPF
BY William A. Murray
ATTORNEY 3,219,145
COTTON HARVESTER
Arthur L. Hubbard and Edward C. Bopf, Des Moines, Iowa, assignors to Deere & Company, Moline, Ill., a corporation of Delaware
Filed July 16, 1962, Ser. No. 209,899
5 Claims. (Cl. 184—7)

This invention relates to a harvesting mechanism for use in a cotton harvester. More particularly the invention relates to a pressurized lubricating system for lubricating system for lubricating the internal mechanism of the harvesting assembly.

In the conventional type of cotton harvester, there is provided a harvesting mechanism composed of an upright picking drum having a centrally located upright column or support rotatably driven about an upright axis. The drum supports angularly spaced upright picker bars, the latter having laterally extending picker spindles projecting therefrom. Normally there are as many as sixteen picker bars spaced around the central column or support with each picker bar having as many as twenty spindles. A provision is made for the picker bars to oscillate about their own axes and for the spindles to be driven from a vertical drive shaft in the picker bars by means of bevel gears. Consequently the column or main support is driven about its own upright axis while the picker bar is driven about its upright axis and each individual spindle is driven about its axis. To insure proper operation of the harvesting mechanism, it becomes fully apparent there must be a highly efficient lubricating system. In the past, it has been conventional to provide a lubricating fitting for each picker bar, and for the bearings on the upright column or drum. However, the manual lubrication of these many parts is not only subject to the usual human errors, but also is time consuming as compared to the lubricating system presently to be described, due to the many parts to be lubricated and the hidden locations of some of the parts.

It is therefore the primary object of the invention to provide an automatic lubricating system operating in response to rotation of the drum and oscillation of the upright picker bars relative to the drum. Specifically it is an object of the invention to provide a cotton harvester having a pressurized lubricant supply feeding to a reservoir at the base of the central upright column and from thence through flexible connections to the individual picker bars.

It is still a further object of the present invention to incorporate in the flexible connections between the reservoir at the base of the drum and the picker bars individual pumps having external operating elements. It is further proposed to provide on the central support or column abutting members contacting the operating elements of each pump so as to respond to the oscillation of the individual picker bars to move lubricant from the base reservoir into the respective picker bars. Thus, the lubrication of the picker bar is systematically insured by the mere operation of the harvesting mechanism.

Other objects and advantages of the present invention will become apparent to those skilled in the art as the nature of the invention is better understood from the following description and as shown in the accompanying drawings.

FIG. 1 is a schematic view showing a portion of the cotton harvester frame and a lubricating supply, and a harvesting drum incorporating the structure of the present invention.

FIG. 2 is a sectional view taken substantially along the line 2—2 of FIG. 1.

FIG. 3 is an enlarged sectional view taken substantially along the line 3—3 of FIG. 2.

Figure 4:
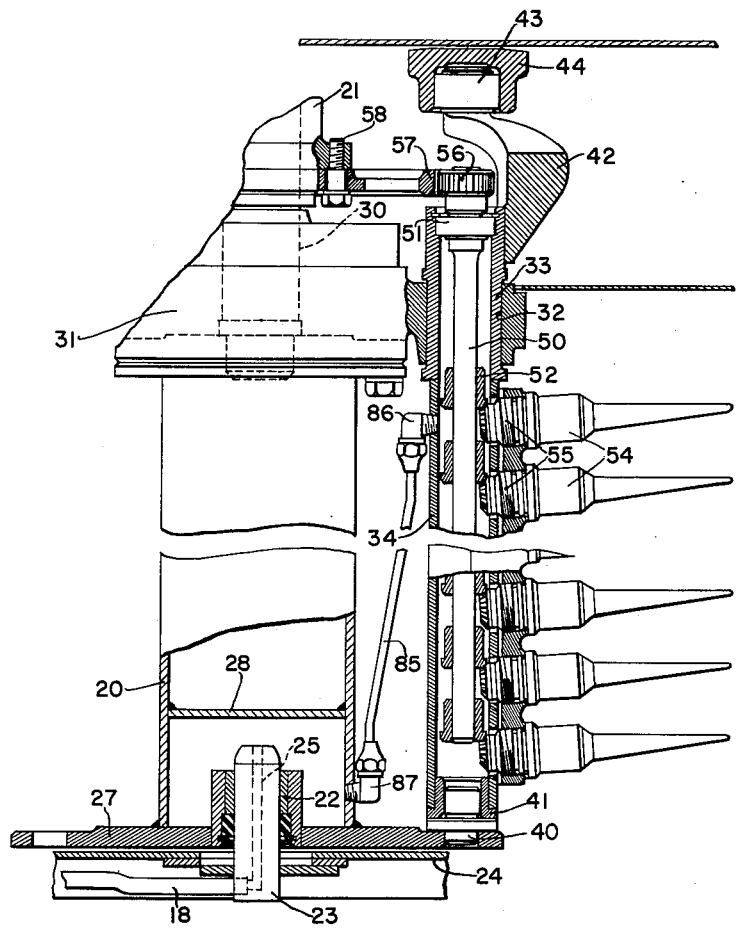
FIG. 4 is an enlarged view of a cotton harvesting mechanism with part thereof shown in section and showing a slight modification of the invention as shown in the previous figures.

The cotton harvester may be composed of a main frame, indicated only partially at 10, carrying an operator's platform 11 having an operator's seat 12 and steering and other controlling mechanism as at 13. On the main frame 10 is a main reservoir 14 containing a lubricant fluid. As indicated in representative form in FIG. 1, fluid is retained under pressure in the reservoir 14 by means of a spring 15 bearing against a plate 16 lying on top of the fluid. An adjustable hand valve 17 is provided in a main conduit 18 leading from the reservoir 14 to the base of the harvesting mechanism.

The overall cotton harvester may be similar to any of a series of types shown in prior U.S. patents, for example, such as one shown in U.S. Patent 2,912,285 which issued to Mr. A. L. Hubbard November 10, 1959. The harvesting mechanism, while shown only generally in the present disclosure and for the primary purpose of orienting the present invention, may in many respects be of a type shown in U.S. Patent 2,723,520 which issued to Mr. W. L. Hubbard November 15, 1955. The Hubbard patents are mentioned here so that reference may be made to them if detailed information relative to the harvester and to the harvesting mechanism is desired.

The harvesting mechanism is composed of an upright drum or column 20 supported in a conventional type cotton harvester housing and at its upper end by means of an upper bearing 21. The column 20 is journaled at 22 at its lower end on an upright pilot shaft 23 fixed to and projecting upwardly from a floor panel 24. The shaft 23 has a central fluid passage 25 extending vertically. The passage 25 opens laterally at the base of the shaft 23 and receives the end of the conduit 18. Consequently fluid may be received at the base of the column 20 in a pressurized form from the main reservoir 14, through the conduit 18 and passage 25.

A secondary reservoir or manifold is provided at the base of the column at 20 and is defined at its lower end by a horizontal plate 27 welded to the lower edge of the column 20, by the column itself, and at its upper end by a horizontally disposed plate or divider 28 placed within the welded to the interior surface of the column 20. An upright post or shaft 30 is rigidly fixed to a header 31 and is rotatably supported in the aforementioned upper bearing 21. The header 31 projects radially from the drum 20 and has therein a series of angularly spaced openings 32 in which are journaled upper extensions or ends 33 of picker bars, indicated in their entirety by the reference numeral 34. The openings 32 and respective bars 34 are spaced from the column 20 to provide a space between the picker bars and the column 20. The openings 32 permit the picker bars to oscillate relative to the drum 20 and about their own axes. The lower ends of the picker bars 34 are rotatably mounted on short pilot shafts 40 extending upwardly from the base plate 27. Suitable journal elements 41 are provided on the lower ends of the bars 34 for rotation on the pilot shafts 40. Fixed to the upper end of the extension 33 is a follower arm 42 having an upper roller 43 contained in a slot formed in cam member 44. The entire operation of the picker bar 33 is more specifically explained in the aforementioned Hubbard patent. However, to review the operation, as the drum 20 rotates the bars 33 also rotate. The cam roller 43 causes each picker bar to oscillate about its own axis as the drum 20 rotates.

An upright spindle drive shaft 50 is journaled at 51 in the extension 33. The shaft 50 carries thereon a series of bevel splines 52 engaging the splined ends 53 of vertically spaced and laterally extending spindle assemblies 54. Each spindle assembly is threadedly attached as at 55 to the picker bar 34. The shaft 50 is driven at its upper end by a spur gear 56 meshing with a spur pinion 57 fixed to the shaft 30. As the shaft 30 and its column 20 rotates, the gear 56 and consequently the entire shaft 50 and the spindles 54 attached thereto also rotate.

Referring now to FIGS. 1, 2 and 3, there is provided flexible conduit means extending from the lower reservoir at the base of the column or post 20 to each of the respective picker bars 34. Each conduit means includes a short flexible rubber or plastic line 60, a fitting 61 connecting the lines 60 to the reservoir and a pump arrangement 62 connecting the lines 60 to the respective picker bars. The pump arrangement 62 is shown in cross section in FIG. 3 and includes an elbow 63 directly connected to an internal opening in the picker bar 34 and a T-shaped valve or pump member 64 connected to the lower end of the elbow 63 and having one leg thereof connected to a second fitting 65 attaching the conduit 60 thereto. A pair of check valves 66, 67 is provided adjacent the conduit 60 and the elbow 63 respectively. The fitting 65 has a surface 68 receiving the valve member 66 so that fluid may move into the picker bar from the line 60 but may not be reversed. Similarly the T-shaped member 64 has an internal surface 69 on which the valve member 67 may seat so that fluid may move into the picker bar 34, but the reverse may not be affected. A pair of stop members 70, 71 is provided adjacent the valves 66, 67 so as to limit movement away from the respective seats for the valves.

A small plunger 75 is provided in one leg of the T-shaped member 64 and has a depending operating arm or stem 76 extending downwardly and away from the entire fitting 62. A spring 77 bears against the plunger 75 so as to force the plunger 75 downwardly.

Fixed to and extending radially from the drum 20 is a horizontal plate 80 with an upper surface 81 inclined downwardly from a radial inner portion to its outer periphery. The surface 81 operates as a cam and normally engages the lower end of the plunger stem 76. In operation the spindle bars 34 oscillate thereby moving the stems 76 radially as respects the drum or column 20. Consequently the lower ends of the stems 76 move vertically as the stem 76 moves radially over the surface 81.

The form of the invention shown in FIGS. 1, 2 and 3 operate as follows. Lubricating fluid is fed under pressure from the main reservoir 14 to the reservoir at the base of the column 20. The quantity of lubricant may be controlled by positioning the valve lever 17. However, in most instances it is desirable to maintain full pressure on the conduit or line 18 so as to retain the reservoir at the base of the drum constantly in a full condition. Upon the drum or column 20 rotating the picker bars 34 oscillate. In a manner as above described, the plunger 75 reciprocates vertically and in the particular instance when it moves downwardly draws fluid from the line 60 and past the valve 66. At this time the valve 67 is seated and fluid is not drawn from the picker bar. Upon the plunger 75 moving upwardly, the valve 66 seats against the surface 68 to prevent fluid from moving back through the line 60 and the valve 67 rises from its seat permitting fluid to pass through the elbow 63 into the picker bar 34. The lines 60 being flexible permit the oscillation of the picker bar relative to the drum 20. In this respect it should also be noted that the outer edge or periphery of the plate 80 is scalloped with each scallop receiving one picker bar 34. Consequently the lower ends of the stems 67 are always retained in engagement with some portion of the surface 81.

In the modified form of the invention shown in FIG. 4, fluid is fed into the lower end of the drum 20 in a manner of the previous form. The primary difference lies in the fact there is not a pump disposed between the individual picker bars 34 and lower reservoir. In this respect, it should be noted there is provided a flexible conduit 85 extending from the lower reservoir upwardly to a fitting 86 adjacent the top of the respective bars 34. A second fitting 87 is provided at the lower end of the flexible conduit 85 and connects the latter to the reservoir.

In this form of the invention the pressure for moving the fluid from the main reservoir to the lower secondary reservoir and from thence into the upper ends of the respective picker bars is maintained substantially by the spring 15 and its plunger 16. The quantity of lubricant fed into the respective picker bars may be adjusted by the valve and the relative position of the valve lever 17. By placing the fitting 81 in the upper end of the picker bar, gravity is partially relied upon to lubricate the lower portions of the picker bar.

While only one modification of the invention has been shown, it should be recognized that other forms and variations may occur to those skilled in the art. Therefore, while the present disclosure is shown and described in detail for the purpose of completely illustrating the principles of the invention, it is not the intention to limit or narrow the invention beyond the broad concepts set forth in the appended claims.

What is claimed is:

1. In a cotton picker having a main frame and a vertical rotary drum including vertical shaft means supported on upper and lower journals and carrying a plurality of vertically extending tubular picker bars therearound, each picker bar being oscillable on its vertical axis and having spindles journaled therein and extending outwardly therefrom, and drive means in each picker bar for the respective spindles, a lubricating system for the picker bars comprising a lubricant container on the cotton picker, said drum carrying a lubricant manifold at the base thereof and for rotation in unison therewith, said manifold being formed about and outwardly of the shaft means, means for delivering lubricant at predetermined rates from said container to said manifold, part of said means including a delivery connection through the lower journal for permitting rotation of the drum, and flexible fluid conduit means between said manifold and said picker bars for distribution of lubricant from said manifold to said picker bars, said fluid conduit means being flexible so as to accommodate oscillation of the picker bars.

2. In a cotton picker as set forth in claim 1, in which the conduit means comprises flexible tubes connecting the manifold and the picker bars.

3. A harvesting assembly for a cotton harvester having therein a lubricant supply, comprising: an upright column; a series of upright hollow picker bars spaced angularly around the column and spacedly therefrom and having upper and lower ends; upper and lower support means extending from the column connected to the upper and lower ends of the picker bars and for oscillatingly supporting the bars; a centrally located journal means at the base of the column for rotatably supporting the column for rotation about an upright axis, the journal means having an axially extending fluid passage; a fluid reservoir at the base of the column communicating with the fluid passage, said reservoir being formed about the axis and circumscribing the journal means; conduit means extending between the fluid passage and the lubricant supply; a series of fluid conduits extending from the reservoir to the respective picker bars; a pump device in each of the fluid conduits with an external operating element; abutment means on the column in operative contact with the external operating elements and responsive to oscillation of the picker bars to cause passage of lubricant fluid in measured amounts from the respective conduits to the picker bars.

4. A harvesting assembly for a cotton harvester having therein a lubricant supply, comprising: an upright column; a series of upright hollow picker bars spaced angularly around the column and spacedly therefrom and having upper and lower ends; upper and lower support means extending from the column connected to the upper and lower ends of the picker bars and for oscillatingly supporting the bars; a centrally located vertical pivotal support for rotatably supporting the column, the pivotal support having a fluid passage; a fluid reservoir formed about and outwardly of the pivotal support at the base of the column communicating with the fluid pasage and supported for rotation in unison with the column; conduit means extending between the fluid passage and the lubricant supply; and a series of flexible fluid conduits extending between and connected to the reservoir and the respective picker bars.

5. The invention defined in claim 4 further characterized by a plurality of pumps opening into the flexible conduits for moving fluid through the conduits, each pump having cooperating parts operatively connected to the picker bars and column and responsive to oscillation of the picker bars to move fluid through the flexible conduits.

References Cited by the Examiner
UNITED STATES PATENTS

| | | | |
|---|---|---|---|
| 2,723,520 | 11/1955 | Hubbard | 56—47 |
| 2,743,569 | 5/1956 | Barbknecht et al. | 56—44 |
| 2,952,966 | 9/1960 | Serra | 184—7 |
| 2,991,846 | 7/1961 | Bystricky et al. | 184—7 |
| 3,144,096 | 8/1964 | Rotter | 184—7 |

LAVERNE D. GEIGER, *Primary Examiner.*

RUSSELL R. KINSEY, MILTON KAUFMAN,
*Examiners.*